United States Patent [19]

Wang

[11] Patent Number: 4,977,235

[45] Date of Patent: Dec. 11, 1990

[54] POLYARYLATE POLYMERS

[75] Inventor: Pen-Chung Wang, Houston, Tex.

[73] Assignee: Shell Oil Company, Houston, Tex.

[21] Appl. No.: 454,727

[22] Filed: Dec. 21, 1989

Related U.S. Application Data

[63] Continuation-in-part of Ser. No. 314,515, Feb. 23, 1989, Pat. No. 4,910,285.

[51] Int. Cl.$^5$ .............................................. C08G 8/00
[52] U.S. Cl. .................................. 528/220; 528/176; 528/183; 528/185; 528/189; 528/190; 528/228; 528/229; 528/272; 528/289; 528/292; 528/298; 528/403; 525/437; 525/471
[58] Field of Search ............... 528/220, 298, 228, 229, 528/176, 183, 185, 189, 190, 272, 289, 292, 403; 525/437, 471

[56] References Cited

U.S. PATENT DOCUMENTS

| | | | |
|---|---|---|---|
| 3,216,970 | 11/1965 | Conix | 260/47 |
| 3,969,294 | 7/1976 | Papouchado | 524/68 |
| 4,100,140 | 7/1978 | Zanir et al. | 526/90 |
| 4,652,608 | 3/1987 | Parker | 525/132 |
| 4,663,464 | 5/1987 | Hockstra | 548/453 |
| 4,800,231 | 1/1989 | Wang | 560/176 |
| 4,847,388 | 7/1989 | Wang | 548/410 |

Primary Examiner—John Kight, III
Assistant Examiner—Sam A. Acquah

[57] ABSTRACT

Novel polyarylate polymers comprise alternating moieties derived from an aromatic dicarboxylic acid halide, with moieties derived from a hydroxyaryl-substituted 1,6-diaza [4.4] spirodilactam compound and, optionally, with moieties derived from a di(hydroxyphenyl) compound. The polyarylate polymers are thermoplastic polymers characterized by relatively high glass transition temperatures.

31 Claims, No Drawings

POLYARYLATE POLYMERS

CROSS-REFERENCE TO RELATED APPLICATIONS

This application is a continuation-in-part of Ser. No. 314,515 filed Feb. 23, 1989, now U.S. Pat. No. 4,910,285.

FIELD OF THE INVENTION

This invention relates to certain novel polyarylate polymers. More particularly, the invention relates to novel alternating polyarylate polymers incorporating moieties derived from an aromatic diacid halide, a hydroxyaryl-substituted spirodilactam compound and, optionally a di(hydroxyphenyl) compound.

BACKGROUND OF THE INVENTION

The class of thermoplastic polymers is well known in the art, being particularly useful because of the property exhibited by many of the polymers of being deformable at relatively low temperatures. Thus, such thermoplastics are processed by conventional techniques such as extrusion, injection molding or thermoforming into sheets, films, fibers, molded articles and other useful objects without undue degradation of the polymer.

This property that makes many of the thermoplastics particularly useful, i.e., low temperature deformation, also precludes the use of many thermoplastics in engineering applications where exposure to elevated temperatures is likely to be encountered. When relatively high temperature applications for thermoplastics are contemplated, it is often useful to employ a thermoplastic which incorporates, within the polymeric chain, one or more cyclic structures which typically raises the melting point or glass transition temperature of the polymer. Among the types of thermoplastics which incorporate a plurality of cyclic structures is the class known as polyarylate polymers. The polyarylates are typically esters of aromatic diacids and dihydric phenols. In such polymers, 2,2-di(4-hydroxyphenyl) propane, also known as bisphenol A or BPA, is frequently employed as the phenolic component. Nevertheless, glass transition temperatures at or above 200° C. are not frequently encountered, in at least in commercial polyarylate thermoplastics. Moreover, certain of the thermoplastics which do melt or soften above 200° C. are found to degrade upon conventional processing of the polymer. It would be of advantage to provide a novel class of thermoplastics of relatively high glass transition temperatures which are processable without undue degradation.

SUMMARY OF THE INVENTION

This invention provides a novel class of polyarylate polymers which incorporate within the polymer chain a plurality of cyclic structure. More particularly the invention relates to polyarylate polymers of moieties derived from an aromatic dicarboxylic halide alternating with moieties of an oxyaryl-substituted 1,6-diaza [4,4] spirodilactam compound and, optionally, moieties of a di(oxyphenyl) compound.

DESCRIPTION OF THE INVENTION

The novel polyarylate polymers of the invention are produced by the reaction of a metal salt, particularly an alkali metal salt, of a 1,6-diaza [4,4] spirodilactam having a hydroxyaryl substituent on each of the spiro ring nitrogen atoms, and, optionally, an alkali metal salt of a di(hydroxyphenyl) compound, with an aromatic dicarboxylic acid halide, i.e., the acid halide corresponding to an organic dicarboxylic acid. By reaction of the monomers, typically an interfacial reaction, a polyarylene polymer is produced which is characterized by alternating moieties derived from the diacid halide alternating with moieties from the hydroxyaryl-substituted spirodilactam and optionally from the di(hydroxyphenyl) compound.

The hydroxyaryl-substituted spirodilactam precursor of the alkali metal salt reactant is a [4.4] spirodilactam having spiro ring nitrogen atoms in the 1- and 6-ring positions and having hydroxyaryl substituents on each of the spiro ring nitrogen atoms. One class of such spirodilactams comprises spirodilactams having up to 60 carbon atoms and is represented by the formula

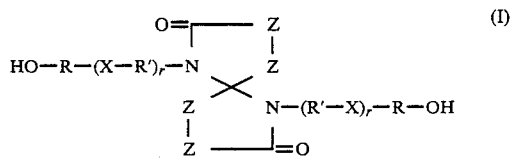

where Z independently is $>C(Z')_2$ in which Z' independently is hydrogen, lower alkyl of up to 4 carbon atoms inclusive, preferably methyl, or halogen, preferably the lower halogens fluoro and chloro, or aryl, preferably phenyl, or Z is such that two adjacent Z groups taken together form a ring system Z" of from 5 to 7 ring atoms, up to two of which are heteroatoms selected from nitrogen, oxygen or sulfur, with the remainder of the ring atoms being carbon atoms, there being up to 15 carbon atoms inclusive in each Z", two of which form a bridge between the carbon atoms connected by the adjacent Z groups. In the above formula I, R' independently is aromatic of up to 15 carbon atoms and up to 2 aromatic rings, inclusive, R' independently is R or an aliphatic group of up to 10 carbon atoms inclusive, r independently is 0 or 1 and X independently is a direct valence bond, alkylene of up to 8 carbon atoms inclusive, oxy, thio, sulfonyl, carbonyl, dioxyphenylene, 2,2-di(oxyphenyl)propane, i.e., di(oxyphenyl) sulfone, i.e., or dioxydiphenylene. Each of R and R' independently is hydrocarbyl containing only atoms of carbon and hydrogen or are substituted hydrocarbyl containing additional atoms present in the form of inert carbon atom substituents such as halogen, particularly the middle halogens, chloro or bromo.

Spirodilactams of a considerable variety of structures are therefore suitably employed as the spirodilactam precursor of the alkali metal salt reactant. In the embodiment where in the Z moieties of the above formula I are not part of a fused ring system and are therefore acyclic, i.e., Z is $>C(Z')_2$, the spirodilactam is illustrated by 1,6-di(4-hydroxyphenyl)-1,6-diazaspiro-[4.4]nonane-2,7-dione, 1,6-di(3-hydroxy-4-chlorophenyl)-1,6-diazaspiro[4.4]nonane-2,7-dione, 1,6-di[3-(d-hydroxybenzoyl)phenyl]-1,6-diazaspiro[4.4]nonane-2,7-dione, 1,6-di(4-hydroxyphenyl)-3,3,4,4,8,8,9,9-octamethyl-1,6-diazaspiro[4.4]-nonane-2,7-dione, 1,6-di[4-(4'-hydroxybiphenyl)-3,3-dimethyl-1,6-diazaspiro[4.4]nonane-2,7-dione, 1,6-di[2-(4-hydroxyphenyl)-propyl]-1,6-diazaspiro[4.4]-nonane-2,7-dione, 1,6-di(4-hydroxyphenyl)-3,4,8,9-tetrafluoro-1,6-diazaspiro[4.4]nonane-2,7-dione and 1,6-di(4-(4-hydroxyphenylispropyl)phenyl]-1,6-diazaspiro[4.4]nonane-2,7-dione.

In the embodiment wherein adjacent Z moieties on each spiro ring form a cyclic structure fused to the spiro ring system, i.e., adjacent Z groups are Z", illustrative spirodilactams include 1,6-di(4-hydroxyphenyl)-3,4,8,9-dibenzo-1,6-diazaspiro[4.4]nonane-2,7-dione, 1,6-di[4-(4-hydroxphenyloxyphenyl]-3,4,8,9-di(pyrido)-1,6-diazaspiro[4.4]nonane-2,7-dione. Also suitable are those spirodilactams wherein one spiro ring has a fused ring substituent and the other spiro ring is free from fused ring substituents, e.g., 1,6-di(4-hydroxyphenyl)-3,4-benzo-8-methyl-1,6-diazaspiro[4.4]nonane-2,7-dione and 1,6-di[1-(4-hydroxynaphthyl)]-3,4-cyclohexano-1,6-diazaspiro[4.4]nonane-2,7-dione.

In general, compounds of the above formula I wherein R and R' are aromatic and hydrocarbon are preferred with further preference given to the compounds wherein r is 0. Within the spirodilactam portion of the molecule spiro rings which are substituted with hydrogen or methyl are preferred when Z is acyclic and rings substituted with benzo are preferred when adjacent Z moieties are Z". The compound 1,6-di(4-hydroxyphenyl)-1,6-diazaspiro[4.4]nonane-2,7-dione is a particularly preferred member of the former class whereas 1,6-di(4-hydroxyphenyl)-3,4,8,9-dibenzo-1,6-diazaspiro[4.4]nonane-2,7-dione is a particularly preferred member of the latter class.

The hydroxyaryl-substituted spirodilactams of formula I are compounds which are described in more detail and claimed as compositions of matter in copending U.S. patent application Ser. No. 245,618, filed Sept. 16, 1988. The general methods of production, also described in this copending application, as well as in copending U.S. patent applications Ser. No. 172,000, filed Mar. 23, 1988 and Ser. No. 172,052, filed Mar. 23, 1988, each of which incorporated herein by reference, is by reaction of at least one hydroxy-containing primary amino compound and a precursor of the spirodilactam. In terms of the substituted spirodilactam of the above formula I, the hydroxy-containing primary amino compound is represented by the formula $$HO-R-(X-R')_r-NH_2 \quad (II)$$

where R, R', r and X have the previously stated meanings. The precursor of the spirodilactam is a 4-oxoheptanedioic acid compound or a 1,6-dioxa-spiro[4.4]nonane-2,7-dione spirodilactone compound. In terms of production of the substituted spirodilactams of formula I, the 4-oxoheptanedioic acid compound is represented by the formula

(IIIa)

where A independently is hydroxy, lower alkoxy of up to 4 carbon atoms or halo, preferably the middle halogens, chloro or bromo, and Z has the previously stated meaning. When the precursor of the spirodilactam is the spirodilactone, the spirodilactone to be employed for production of the spirodilactam of formula I is represented by the formula

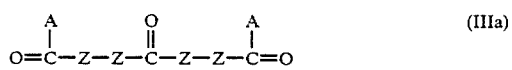

(IIIb)

where Z has the previously stated meaning.

The acyclic 4-oxoheptanedioic acid compounds are known or are produced by known methods but certain of the esters are also particularly conveniently produced by the process of copending U.S. patent application Ser. No. 171,999, filed Mar. 23, 1988. The process involves reaction of formaldehyde with unsaturated carboxylic acid esters such as methyl acrylate or ethyl methacrylate in the presence of a catalyst system comprising a thiazolium salt and a tertiary amine. Interconversion of the esters, acids or acid halides of formula IIIa is by conventional methods. The production of 4-oxoheptanedioic acid compounds which contain cyclic moieties is by the process of Cava et al, J. Am. Chem. Soc., 20, 6022 (1955). The spirodilactones of formula IIIb are produced by the process of Pariza et al, Synthetic Communications, Vol. 13(3), pp 243-254 (1983) or by the process of U.S. Pat. No. 1,999,181.

The hydroxy-containing primary amino compound and the precursor of the spirodilactam will react in a molar ratio of 2:1 although in practice reactant ratios from about 8:1 to about 1:1.5 are satisfactory. Reactant ratios which are substantially stoichimetric are preferred. Reaction is conducted in a liquid phase solution in an inert reaction diluent such as an N-alkylamide, e.g., N,N-dimethylformamide or N-methyl-2-pyrrolidone. Reaction takes place at an elevated temperature, typically from about 80° C. to about 250° C., and at a reaction pressure sufficient to maintain the reaction mixture in the liquid phase. Such reaction pressures are up to about 20 atmospheres but more often up to about 10 atmospheres. Subsequent to reaction the spirodilactam product is recovered form the product mixture by conventional methods such as solvent removal, precipitation or chromatographic separations. Recovery of the spirodilactam product is not required, however, and particularly in cases where substantially stoichiometric quantities of reactants were employed the spirodilactam can be further reacted in situ as to produce the alkali metal salt.

The di(hydroxyphenyl) compound whose alkali metal salt is employed as an optional reactant. Illustrative of such compounds include dihydroxybenzenes such as hydroquinone and resorcinol, dihydroxynaphthalenes such as 2,7-dihydroxynaphthalene, 1,5-dihydroxynaphthalene and preferably a di(4-hydroxyphenyl) compound represented by the formula

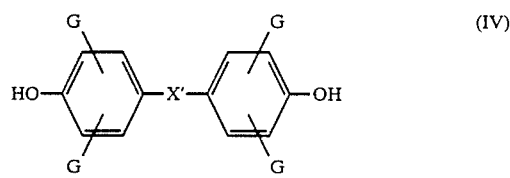

(IV)

wherein G independently is hydrogen, lower alkyl or middle halo and X' is a direct valence bond, alkylene of up to 8 carbon atoms, inclusive, oxy, thio, sulfonyl or carbonyl. Illustrative of such di(hydroxyphenyl) compounds is 2,2-di(4-hydroxyphenyl)propane, 2,2-di(4-hydroxy-3-methylphenyl)methane,di(4-hydroxy-3-chlorophenyl) sulfone, 2,2-di(4-hydroxy-3,5-dibromophenyl)propane,(4-hydroxyphenyl), (4-hydroxy-3,5-dibromophenyl) ether,2-(4-hydroxyphenyl)-2-(4-hydroxy-3-chloro-5-methylphenyl)propane, 4,4'-dihydroxybiphenyl, di(4-hydroxyphenyl) ketone and di(4-hydroxy-3-methylphenyl) sulfide or position isomers thereof. The compounds of the above formula IV wherein each G is hydrogen or halo, and X' is 2,2-propylene are preferred and the compound 2,2-di(4-hydroxyphenyl)propane, also referred to as bisphenol A or BPA, is a preferred member of the class of di(hydroxyphenyl) compounds. These compounds are known or are produced by known methods.

The alkali metal salt of the hydroxyaryl-substituted spirodilactam compound, and, optionally of the di(hydroxyphenyl) compound, which is employed to produce the polyarylene polymers of the invention is prepared by conventional methods from the hydroxyaryl-substituted spirodilactam compound or the di(hydroxyphenyl) compound. While lithium, sodium, potassium, rubidium or cesium salts of the hydroxy-containing reactants are usefully employed in the production of polymer, the preferred alkali metal salts are the sodium salt or the potassium salt. In a typical production, the desired spirodilactam is dissolved in a suitable solvent such as 1,1,2-trichloroethane or N-methyl-2-pyrrolidone and an at least stoichiometric quantity of an alkali metal hydroxide, carbonate or bicarbonate is added to produce the alkali metal salt. The salt of the hydroxyaryl-substituted spirodilactam compound and/or the di(hydroxyphenyl) compound is recovered, if desired, as by solvent removal but typically is employed in the reaction with the diacid halide without isolation. In the modification where terpolymer is to be produced, it is useful to produce the alkali metal salt of the bydroxyaryl-substituted spirodilactam compound and the di(hydroxyphenyl) compound in the same reaction as by contacting a mixture of these hydroxy-containing compounds with an alkali metal base. Alternatively, however, the two alkali metal salts are produced separately and subsequently mixed.

The diacid halide reactant of the process of the invention is the acid halide of an aromatic dicarboxylic acid of up to 30 carbon atoms having two acid halide moieties as substituents on carbon atoms of aromatic rings. One class of such acid halides is represented by the formula

(V)

where A' is halogen, preferably middle halogen and particularly chloro, and R" is divalent arylene of up to 28 carbon atoms and from 1 to 2 aromatic rings, inclusive, and which rings, when two rings are present, are fused or connected by a linking group X, where X has the previously stated meaning. Illustrative diacid halides include phthaloyl chloride isophthaloyl chloride, terephthaloyl bromide, 4,4'-dichlorocarbonylbiphenyl, di(bromocarbonylphenyl) ketone, isophthaloyl fluoride, 1,3-di(4-chlorocarbonylphenyloxy)benzene, di(3-bromocarbonylphenyl) ether, di[4-(4-chlorocarbonylphenyloxy)phenyl]sulfone, 2,2-[4-(4-bromocarbonylphenyloxy)phenyloxy]propane and di(4-chlorocarbonylphenyl) sulfone. In general, the aromatic diacid halides which are otherwise hydrocarbyl, except for any additional atoms in divalent linking groups, are preferred and particularly preferred are those compounds wherein R" has one aromatic ring. Best results are obtained when the diacid halide moieties are substituted on aromatic ring carbon atoms which are meta or para to each other, i.e., an isophthaloyl halide or a terephthaloyl halide.

The process of producing the polyarylene polymers of the invention comprises the reaction of the alkali metal salt of the hydroxyarylsubstituted spirodilactam compound and the alkali metal salt of the di(hydroxy) compound, if present, with the aromatic diacid halide to produce the linear polymer of alternating moieties derived from the hydroxyaryl-substituted spirodilactam compound, optionally the di(hydroxyphenyl) compound and from the aromatic diacid halide. The alkali metal salt of the di(hydroxyphenyl) compound is not, of course, always employed but when present it is present in a molar quantity of up to about 9 times the molar quantity of the alkali metal salt of the hydroxyaryl-substituted spirodilactam compound. Quantities of the alkali metal salt of the di(hydroxyphenyl) compound from about twice to about one-half of the quantity of spirodilactam salt are preferred. The diacid halide is employed in a molar ratio of from about 4:1 to about 1:4 as compared to the total of the other reactants. However, since the stoichiometry of the reaction is such that one mole of diacid halide reacts with one mole of other reactant, molar ratios of diacid halide to the total of the other reactants that are substantially stoichiometric, i.e., from about 1.5:1 to about 1:1.5, are preferred.

In part because of the difficulty of employing a reaction diluent in which the alkali metal salt reactant, or optionally, alkali metal salt reactants, and the diacid halide reactant are soluble, the polymerization is typically conducted under polymerization conditions as an interfacial polymerization, that is, a polymerization that takes place at the interface of two substantially immiscible solvents. In such a polymerization, one type of reactant is customarily present in each of the two solvent phases and reaction is facilitated by utilization of a phase transfer agent such as a quaternary ammonium salt or one of the cyclic large-ring polyethers known as crown ethers. In the case of the reactants of the present invention, the process is efficiently conducted in a reaction environment where one phase is aqueous and the other phase comprises an organic solvent such as 1,1,2-trichloroethane or chloroform. In a particularly preferred embodiment, the hydroxyaryl-substituted spirodilactam compound, the di(hydroxyphenyl) compound, if present, and an alkali metal hydroxide are added to the solvent system while vigorous stirring or other agitation is maintained. Subsequent to this in situ production of alkali metal salt reactant, the aromatic dicarboxylic acid halide reactant is added, also with agitation, and the polymerization takes place at the phase interface. Trialkylbenzylammonium halides such as triethylbenzylammonium chloride are particularly useful as phase transfer agents in this modification.

High molecular weight polymers are preferably prepared by use of the interfacial polymerization described above in which the organic solvent comprises (1) an organic solvent in which the reactants and the polyarylate are substantially soluble and (2) an alcohol, e.g. isopropanol, in which the polyarylate is substantially insoluble.

The alcohol helps to prevent emulsions in the aqueous-organic medium.

The reaction temperature is typically near or below ambient temperature and temperatures from about 0° C. to about 35° C. are satisfactory. The reaction pressure to be used will be one that is sufficient to maintain the reaction mixture in a liquid state. Such pressures are typically up to 20 atmospheres but more often are from about 0.8 atmosphere to about 5 atmospheres. Subsequent to reaction the polymer is typically in the organic phase and is recovered therefrom by conventional methods such as selective extraction or precipitation with a non-solvent followed by filtration or decantation.

The polyarylene copolymer or terpolymer is a linear polymer having di(carbonyl)arylene compound moieties illustratively resulting from loss of the halogens of the aromatic dicarboxylic acid halide alternating with moieties of an oxyaryl-substituted spirodilactam compound illustratively derived by loss of the hydroxy hydrogens of the hydroxyaryl-substituted spirodilactam compound and, optionally, moieties of a di(oxyphenyl) compound illustratively derived from the di(hydroxyphenyl) compound by loss of the hydroxy hydrogens. In terms of the preferred reactants as described above (formulas I, IV and V), the copolymer product is represented by the repeating first segment formula

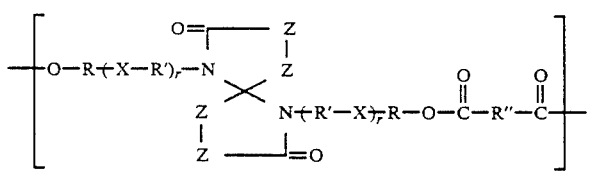

(VI)

wherein R, R', R", X and Z have the previously stated meanings. The terpolymer product additionally contains a preferred second repeating segment of the formula

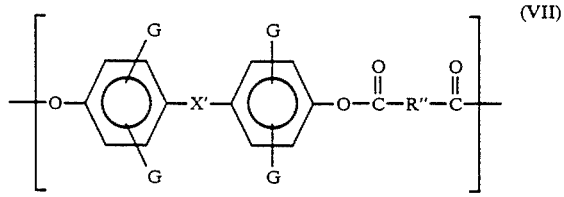

(VII)

wherein G, R" and X' have the previously stated meanings. Within the terpolymer chain the segments of formula VI and of formula VII are found randomly and the molar quantity of the second segment will be up to about 9 times the molar quantity of the first segment but preferably from about twice to about one-half of the quantity of the first segment.

The nomenclature of such polymers is not easily determined because of the complexity thereof but the identity of such products will be apparent from consideration of the formulas for the reactants and the polymer product. However, by way of illustration is the copolymer having alternating units of 1,3-dicarbonylbenzene and 1,6-di(4-oxyphenyl)-1,6-diazaspiro[4.4]nonane-2,7-dione produced from isophthaloyl chloride and the sodium salt of 1,6-di(4-hydroxyphenyl)-1,6-diazaspiro[4.4]nonane-2,7-dione, and the copolymer having alternating units of 4,4'-dicarbonylbiphenyl and 1,6-di(4-oxyphenyl)-3,4,8,9-dibenzo-1,6-diazaspiro[4.4]nonane-2,7-dione produced by reaction of 4,4'-di(-bromocarbonyl)biphenyl and the potassium salt of 1,6-di(4-hydroxyphenyl)-3,4,8,9-dibenzo-1,6-diazaspiro[4.4]nonane-2,7-dione. Corresponding terpolymers containing units of 2,2-di(4-oxyphenyl)propane are produced when the reaction mixture additionally contains the sodium salt of 2,2-di(4-hydroxyphenyl)propane. Polymer products of the above formula VI and optionally VII are preferred wherein each r is 0 and R" comprises a single aromatic ring. Spirodilactam moieties wherein Z is acyclic >C(Z')$_2$ and Z' is hydrogen or methyl, especially hydrogen, are preferred, as are spirodilactam moieties having adjacent Z groups as Z" wherein Z" is benzo. Of particular interest are the polymers of the above formula V having a molecular weight from about 1,000 to about 100,000.

The novel polyarylate copolymers and terpolymers of the invention are thermoplastic polymers characterized by relatively high glass transition temperatures, typically over 200° C. or even higher. Thus, the polyacrylate polymers enjoy the utility possessed by other thermoplastics of being processable by conventional techniques such as extrusion, injection molding or thermoforming into useful films, sheets, fibers and molded articles However, the polymers of the invention are processed into shaped articles useful for high temperature applications where dimensional stability at elevated temperature is desired. Among such applications are the production of containers for food and drink and the production of base materials for electric and electronic applications.

The invention is further illustrated by the following Illustrative Embodiments which should not be construed as limiting.

Illustrative Embodiment I

To a 500 ml three-necked flask equipped with a mechanical stirrer, thermometer and nitrogen inlet and outlet were charged 10.14g (0.03 mole) of 1,6-di(hydroxyphenyl)-1,6-diazaspiro[4,4]nonane-2,7-dione, 0.2g (0.00009 mole) of triethylbenzylammonium chloride, 0.02g of sodium bisulfite, 2.64g (0.066 mole) of sodium hydroxide, 135 ml of distilled water and 70 ml of 1,1,2-trichloroethane. The reaction mixture was stirred at a motor speed of 1200 rpm under nitrogen at a temperature which did not exceed 10° C. A solution of 6.10 g of isophthaloyl chloride in 40 ml of 1,1,2-trichloroethane was added over a period of 30 minutes. The reaction mixture was then warmed to ambient temperature and maintained at that temperature for four hours. The upper layer was removed by decantation and replaced by 100 ml of distilled water and 30 ml of 1,1,2-trichloroethane. The mixture was then stirred for an additional 20 minutes and the organic layer was then poured into 500 ml of absolute ethanol. The white polymer which precipitated was recovered by filtration, washed with water and dried. The polymer had a glass transition temperature of 231° C. and an inherent viscosity of 0.36 and the nuclear magnetic resonance spectra were consistent with a polymer having alternating units of 1,3-dicarbonylbenzene and of 1,6-di(4-oxyphenyl)-1,6-diazaspiro-[4,4]nonane-2,7-dione.

By way of comparison, a high molecular weight polyacrylate based on 2,2-di(4-hydroxyphenyl)propane (BPA) marketed by Union Carbide under the name ARDEL Polyarylate had a glass transition temperature of 190° C.

Illustrative Embodiment II

The polymer produced according to the procedure of Illustrative Embodiment I is extruded into a thin sheet. When a portion of the sheet is thermoformed into a cup, the cup will have dimensional stability at elevated temperatures.

Illustrative Embodiment III

To a 500 ml three-necked flask equipped with a mechanical stirrer, a thermometer and a nitrogen inlet and outlet were charged 5.07 g (0.015 mole) of 1,6-di(4-hydroxyphenyl)-1,6-diazaspiro[4.4]nonane-2,7-dione, 3.42 g (0.015 mole) of 2,2-di(4-hydroxyphenyl)propane, 0.2 g of triethylbenzylammonium chloride, 0.02 g of sodium bisulfite, 2.64 g (0.066 mole) of sodium hydroxide, 135 ml of distilled water and 70 ml of 1,1,2-trichloroethane. The reaction mixture was stirred at a temperature which did not exceed 10° C. A solution of 6.10 g of isophthaloyl chloride in 40 ml of 1,1,2-trichloroethane was added over a period of 30 minutes. The reaction mixture was then warmed to ambient temperature and maintained at ambient temperature for 4 hours. The upper layer of the resulting mixture was removed by decantation and replaced by 100 ml of distilled water and 30 ml of 1,1,2-trichloroethane. The resulting mixture was stirred for 30 minutes and separated by decantation and the organic layer was poured into 500 ml of absolute ethanol. The white polymer which precipitated was recovered by filtration, washed with water and dried. The polymer had a glass transition temperature of 220° C. and the nuclear magnetic resonance spectra were consistent with a polymer having units of 1,3-dicarbonylbenzene alternating with units of 1,6-di(4-oxyphenyl)-1,6-diazaspiro[4.4]nonane-2,7dione and with units of 2,2-di(4-oxyphenyl)propane.

Illustrative Embodiment IV

The monomers, terephthaloyl chloride and isophthaloyl dichloride, obtained from Aldrich were purified by distillation. Bisphenol A was use as received.

A 2 liter four necked flask equipped with mechanical stirrer, thermometer, and nitrogen gas inlet and outlet was charged with 8.11 g (0.024 mole) of 1,6-di(hydroxyphenyl)-1,6-diazaspiro[4.4]nonane-2,7-dione (spirodilactam diphenol), 8.22 g (0.36 mole) of bisphenol A, 0.4 g of triethyl benzyl ammonium chloride, 0.04 g of sodium bisulfite, 5.28 g of sodium hydroxide, 270 ml of distilled water, 420 ml of chloroform and 50 ml of isopropyl alcohol. The reaction mixture was stirred at a motor speed of 1000 rpm under nitrogen at a temperature not exceeding 10° C. A solution of isophthaloyl chloride (12.18 g, 0.06 mole) in 70 ml of chloroform was added over a period of 30 minutes. The reaction was then warmed up to room temperature and continued for an additional 12 hours. Subsequently, the upper layer was decanted and replaced by 100 ml of distilled water and 30 ml of chloroform. The mixture was again stirred for 20 minutes. The organic layer was poured into methanol. A white polymer was precipitated and collected by filtration, washed with water and dried. The molecular structure of the repeating units of the polymer was confirmed by NMR and IR. The polymer had a Tg of 233° C. and an inherent viscosity of 0.81 dl/g.

Illustrative Embodiment V

An experience similar to Embodiment IV was conducted with a 30:70 molar ratio of [4.4] spirodilactam diphenol: bisphenol A. The molecular structure of the repeating units of the polymer was confirmed by NMR and IR spectra. The polymer had a Tg of 220° and an inherent viscosity of 0.74 dl/g.

Illustrative Embodiment VI

An experiment similar to Embodiment IV was conducted with a 50:50 molar ratio of [4.4] spirodilactam diphenol: bisphenol A. The molecular structure of the repeating units of the polymer was confirmed by NMR and IR spectra. The polymer had a Tg of 247° C. and an inherent viscosity of 0.83 dl/g.

What is claimed is:

1. A linear alternating polyarylate polymer comprising moieties of a di(carbonyl)arylene compound of up to 30 carbon atoms alternate with moieties of a 1,6-diaza [4.4] spirodilactam compound having oxyaryl substituents on each spiro nitrogen atom.

2. The polymer of claim 1 having a first repeating segment of the formula

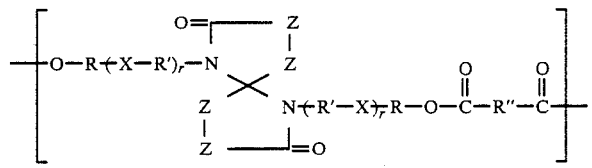

and optionally up to nine times the molar quantity of the first segment of a second repeating segment of the formula

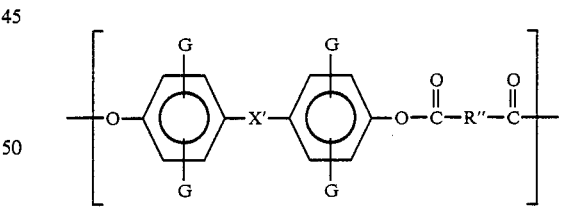

wherein R is aromatic of up to 15 carbon atoms and up to two aromatic rings, inclusive, R' is R or aliphatic of up to 10 carbon atoms, r is 0 or 1, X is a direct valence bond, alkylene of up to 8 carbon atoms inclusive, oxy, thio, sulfonyl, carbonyl, dioxyphenylene, 2,2-di(oxyphenyl)propane, di(oxyphenyl) sulfone or dioxydiphenylene, R'' is divalent arylene of up to 28 carbon atoms and from 1 to 2 aromatic rings, inclusive, Z independently is >C(Z')$_2$ in which Z' independently is hydrogen, lower alkyl, lower halo or phenyl, or Z is such that two adjacent Z groups taken together form a ring system Z'' of from 5 to 7 ring atoms, up to two of which are heteroatoms selected from nitrogen, oxygen or sulfur with the remainder of the ring atoms being carbon atoms, there being up to 15 carbon atoms in each Z'', two of which form a bridge between the carbon atoms connected by the adjacent Z groups, X' is a direct valence bond or X' is alkylene of up to 8 carbon atoms inclusive, oxy, thio, sulfonyl or carbonyl and G independently is hydrogen, lower alkylene or middle halo.

3. The polymer of claim 2 which is a copolymer.

4. The copolymer of claim 3 wherein each r is 0.

5. The copolymer of claim 4 wherein R" has a single aromatic ring.

6. The copolymer of claim 5 wherein Z is $>C(Z')_2$.

7. The copolymer of claim 6 wherein R is phenylene.

8. The copolymer of claim 7 wherein Z is hydrogen.

9. The copolymer of any one of claims 2, 3, 5, 6, 7 or 8 wherein the carbon atoms through which R" is connected to the remainder of the polymer chain are meta or para to each other.

10. The copolymer of claim 9 wherein R is p-phenylene.

11. The copolymer of any one of claims 2, 3, 4, or 5 wherein adjacent Z groups are Z".

12. The copolymer of claim 11 wherein R is phenylene.

13. The copolymer of claim 12 wherein Z" is benzo.

14. The copolymer of claim 13 wherein R is p-phenylene.

15. The polymer of claim 2 which is a terpolymer.

16. The terpolymer of claim 15 wherein G is halo.

17. The terpolymer of claim 16 wherein G is bromo.

18. The terpolymer of claim 17 wherein each r is 0.

19. The terpolymer of claim 18 wherein R" has a single aromatic ring.

20. The terpolymer of claim 19 wherein X' is 2,2-propylene.

21. The terpolymer of claim 20 wherein Z is $>C(Z')_2$.

22. The terpolymer of claim 21 wherein R is phenylene.

23. The terpolymer of claim 22 wherein Z' is hydrogen.

24. The terpolymer of any one of claims 15, 16, 17, 18, 19, 20, 21, 22 or 23 wherein the carbon atoms through which R" is connected to the remainder of the polymer chain are meta or para to each other.

25. The terpolymer of claim 24 wherein R is p-phenylene.

26. The terpolymer of any one of claims 2, 15, 16, 17, 18, 19 or 20 wherein adjacent Z groups are Z".

27. The terpolymer of claim 26 wherein Z" is benzo.

28. The terpolymer of claim 26 or 27 wherein R is p-phenylene.

29. The polymer of claim 2 or 15 wherein the second segment is present at up to twice the molar quantity of the first segment.

30. A shaped article of the polymer of any one of claims 1, 2, 3 5 or 15.

31. A shaped article of the copolymer of claim 30.

* * * * *